United States Patent
Fukano et al.

[19]

[11] Patent Number: 6,132,117
[45] Date of Patent: Oct. 17, 2000

[54] PRINTING APPARATUS, CONTROL METHOD THEREFOR AND MEDIUM FOR STORING THE CONTROL METHOD

[75] Inventors: Kazuko Fukano, Matsumoto; Yoshiaki Kinoshita, Suwa, both of Japan

[73] Assignee: Seiko Epson Corporation, Tokyo, Japan

[21] Appl. No.: 09/277,676

[22] Filed: Mar. 25, 1999

[30] Foreign Application Priority Data

Mar. 26, 1998 [JP] Japan .................................. 10-079701

[51] Int. Cl.⁷ ...................................................... B41J 11/44
[52] U.S. Cl. .............................. 400/76; 400/74; 400/70; 400/61
[58] Field of Search .................................. 400/76, 61–69, 400/70, 74

[56] References Cited

U.S. PATENT DOCUMENTS 5,163,122 11/1992 Urabe et al. .
5,594,653 1/1997 Akiyama et al. ................... 364/468.24

FOREIGN PATENT DOCUMENTS

63-254075 10/1988 Japan .
63-276569 11/1988 Japan .

*Primary Examiner*—John S. Hilten
*Assistant Examiner*—Charles H. Nolan, Jr.
*Attorney, Agent, or Firm*—Mark P. Watson

[57] ABSTRACT

A printing apparatus, a control method therefor, and a medium on which the control method is stored, enable selection of a resume operation to be performed when the printing apparatus resumes operation following an off-line state. The resume operation to be performed after an off-line state is determined by a command received from a host device according to the cause for the off-line state. The resume operation thus determined is performed when the printing apparatus goes on-line again following the off-line state. A marker indicating a particular location in a continuous data stream can be set. If the marker is placed at the beginning of a particular data stream, printing can be resumed from the beginning of the data stream after recovery from an off-line state. By also storing various printer definitions (settings) when a marker is set, the printing apparatus can also be restored to the printer definitions in use when the printer went off-line. By setting a plurality of markers, printing can also be resumed from a selected marker.

28 Claims, 5 Drawing Sheets

PRINTING APPARATUS, CONTROL METHOD THEREFOR AND MEDIUM FOR STORING THE CONTROL METHOD

BACKGROUND OF THE INVENTION

1. Field of the Invention

The present invention relates to a printing apparatus, and to a control method and information recording medium for the same. More specifically, the present invention relates to a printing apparatus wherein a process can be selected to be run after recovering from an off-line status, to a method for controlling the printing apparatus, and to an information recording medium for recording the control method.

2. Description of the Related Art

Today, many common cash registers and desktop calculators are equipped with a printer. These printers are typically used for printing sales receipts, delivery records, rental receipts, and other types of documents containing a certain type of information and format on a single- or multiple-part form.

One type of form used in these printers has perforations defining form units of a specific length in which the particular information is printed. Another type is simply roll paper on which information is printed and the form is then automatically cut or manually torn to an appropriate length. The paper unit printed with a specific set of information is referred to below as a receipt. It should be further noted that some receipts may be the same length as one another, while others will differ in length.

Figure 1:
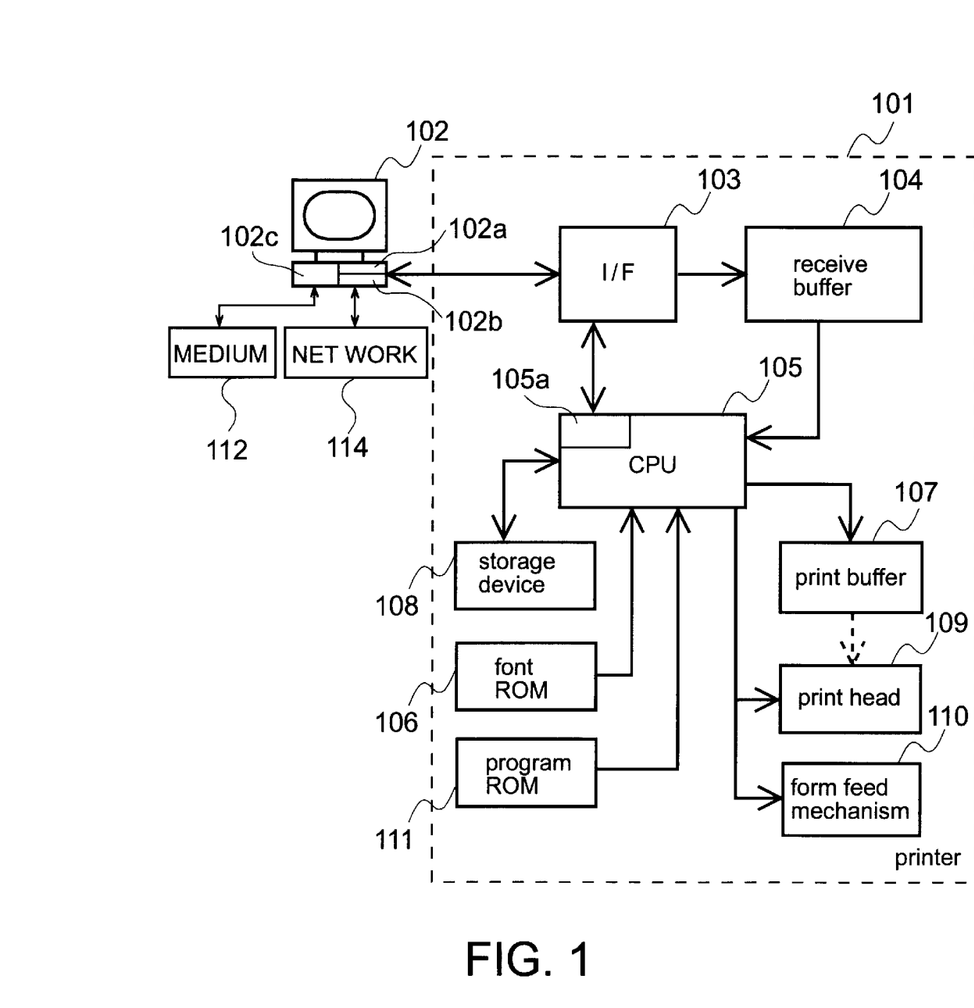
FIG. 1 is a block diagram of a printing apparatus according to the present invention.

FIG. 1 is a block diagram of the basic configuration of a printer 101 according to the present invention but is discussed at this point with reference to aspects of the related art. Print data or control data is sent to the printer 101 from a host 102, which is typically a computer or other data processing device, and is received through interface 103. Received data is temporarily stored in receive buffer 104, which is commonly a ring buffer.

The host 102 may be integrated with the printer in a cash register or desktop calculator in which the printer is incorporated, or it may be a stand-alone general-purpose or specialized computer separate from the printer. Thus, the host 102 could be any device capable of sending data to the printer.

When the host 102 is a computer, a program for controlling the printer 101 typically runs on the host 102. The printer control program run on the host can be easily updated and distributed to users by recording it to a floppy disk, hard disk, CD-ROM, or other computer-readable medium 112. It could also be distributed electronically via a telecommunications network 114.

A CPU 105 in the printer 101 sequentially reads data from the receive buffer 104. If print data indicating text to be printed is read from the receive buffer 104, the CPU 105 reads the font information from a font read only memory (ROM) 106, and buffers the information to be printed to a print buffer 107.

When the CPU 105 reads control commands from the receive buffer 104, it controls the printer 101 according to the received commands. For example, if the control commands are printer definitions (settings), the CPU 105 updates the corresponding printer definitions (settings) stored in storage device 108, which may be a random access memory (RAM). These printer definitions (settings) are referenced when the font information is expanded into the print buffer 107, and include, for example, print ratio settings for enlarged or reduced printing, text attributes such as bold, inverted, and underline, the line feed distance, and the definition of external fonts.

When the print buffer 107 becomes full, or when a line return command or other command initializing printing is detected, the CPU 105 controls the print head 109 or form feed mechanism 110 based on the content of the print buffer 107 to print the content of the print buffer 107 on paper. When one line of printing is completed, the paper is advanced, and the print buffer 107 is cleared.

Printer operation as described above is controlled by the CPU 105 using a control program stored in program ROM 111 or other storage medium. When the printer 101 power is turned on, the CPU 105 loads this program from program ROM 111 and begins operation.

To enable this printer-side control program to be updated as needed, program ROM 111 may be replaced by SRAM, flash ROM, or other type of non-volatile rewritable memory. Alternatively, the printer control program could be stored on floppy disk, hard disk, CD-ROM, or other data storage medium separate from the printer 101, similarly to the control program on the host side.

Processing by the printer may also be interrupted for a variety of reasons. When this occurs, the printer is said to be "off-line." When the problem causing the printer to go off-line is resolved and the printer starts processing again, it is said to "resume operation."

Some possible causes for a printer to go off-line are described below.

(a) No paper (depleted paper supply).

Using roll paper or continuous perforated forms makes it possible to print a large number of forms and replenish the paper supply less frequently. There is, however, still a finite number of forms that can be printed before the paper supply must be replenished. Printer operation can typically be resumed once the paper supply is replenished.

(b) Paper jam occurs during printing.

This condition occurs when the paper is not advanced normally, or jams with a paper fold obstructing print head (carriage) movement. Printer operation can resume once the paper jam is removed.

(c) Overheated print head, resulting from printing continuously for an extended period of time.

When the print head overheats, print head damage can occur and print quality deteriorates. The printer therefore enters an off-line state until the print head temperature drops, and then resumes operation.

(d) The user manually sets the printer off-line.

This can happen, for example, when the user presses an off-line switch on the operating panel of the printer, or opens the printer cover.

It should be noted that none of these off-line conditions necessarily occurs between forms, i.e., after printing of one form or sheet has been completed and before printing of the next form or sheet is started. It is therefore common for the printer to go off-line while in the middle of printing information on a single form.

Current printers typically resume operations with a predetermined operation of reprinting the whole page during which the problem occurred. However, in some printing operations, it is not always preferable to reprint the whole page. For example, in a printing operation in which a sales receipt, coupon and warranty are sequentially printed in one transaction, it is preferable to reprint necessary pages in accordance with how many pages are jammed. Moreover, if an amount of print data usually sent to a printer exceeds the capacity of a receive buffer in the printer, it is preferable to cancel the print job in case of paper jamming.

There is therefore a need for the ability to change the "resume operation", i.e., the process or function performed by the printer when it resumes operation, in accordance with what printing operation the host is directing the printer to perform.

OBJECTS OF THE INVENTION

To meet the above-described needs, an object of the present invention is to provide a printing apparatus capable of resuming operation from an off-line state without printing a wasteful partial receipt and while retaining printer definitions (settings) stored in printer memory. The present invention is further directed to a control method for the printing apparatus, and to an information recording medium for storing the control method as a series of program instructions that can be executable on a machine.

SUMMARY OF THE INVENTION

To achieve the above objects, a printing apparatus for printing based on commands or print data received from a host device comprises: a receiver that receives print data or commands; a buffer that stores the print data or commands received by the receiver; a printing unit that prints according to the print data or commands stored in the buffer; an operation setting section that sets the operation to be performed when the printing apparatus resumes operation from an off-line state, based on a first command from the host device; and a controller that performs the resume operation set by the operation setting section to be performed when the printing apparatus resumes operation from an off-line state.

It is therefore possible with a printing apparatus according to the present invention to preselect the operation to be performed when the printing apparatus resumes operation from an off-line state.

The resume operations that can be performed following an off-line state include resuming printing from the beginning of the area that was being printed when the printing apparatus went off-line.

It is therefore possible to continue a printing process when operation is resumed from an off-line state. It is also possible to resume printing from the beginning of a line that was being printed when the printer went off-line. In the case of a so-called page mode printer, printing can be resumed from the beginning of the printing area that was being printed when the printer went off-line.

The resume operations that can be performed following an off-line state further include continuing execution of a command that was being processed when the printing apparatus went off-line. This makes it possible to continue processing a command that was in the middle of being processed.

The resume operations that can be performed following an off-line state also include clearing buffered print data or commands. This makes it possible to ignore print data that has not been printed when the printing apparatus resumes operation from an off-line state.

The resume operations that can be performed following an off-line state also include stopping a command that was being processed when the printing apparatus went off-line. This makes it possible to ignore commands that had not been processed when the printing apparatus resumes operation from an off-line state.

A printing apparatus according to another embodiment of the present invention further comprises a specification section for storing selection information specifying a particular print data or command stored in the buffer based on a second command from the host device. In this case, the resume operations that can be performed following an off-line state further include an operation for printing from the print data or command stored in the buffer and selected based on the selection information stored in the specification section.

With this version of the invention, it is possible to resume printing from a predetermined point in the print data stream when the printing apparatus resumes operation from an off-line state.

In a printing apparatus according to another embodiment of the present invention, the specification section also stores the printer definitions (settings). In this case, the resume operations that can be performed following an off-line state further include an operation resetting the printing apparatus to the printer definitions stored by the specification section. It thus becomes possible to restore previous printer definitions when printing is resumed.

A printing apparatus according to yet another embodiment of the present invention further comprises a notification section which informs the host device of the result of a resume operation following an off-line state. This makes it possible to request that the print data be re-sent in the event the resume operation fails.

The present invention can also be provided as a control method for a printing apparatus. The control method in this case achieves the same operation and benefits as described above.

A printing apparatus control method according to the present invention can also be provided as a control program to be run by the controller of the printing apparatus. This control program can be supplied using a recording medium on which the control program is recorded. The control program can also be transferred via the Internet or other computer network, for example, for recording by the user on a recording medium accessible to the user's computer or printing apparatus.

An information processing device for sending print data or commands to a printing apparatus to which it is connected for controlling the printing apparatus, in accordance with the present invention, comprises: a transmitter which sends a command directing the printing apparatus what operation to perform when the printing apparatus resumes operation from an off-line state; a receiver which receives from the printing apparatus notification concerning the result of a resume operation following an off-line state; and a re-sending section which resends print data or commands when the receiver receives notification from the printing apparatus that the resume operation could not be successfully completed.

By means of this version of the present invention, it is possible to achieve the desired print results when the resume operation to be performed by the printing apparatus after an off-line state fails by resending the print data from a host computer or other information processing device.

The present invention can also be provided as a control method for an information processing device. The control method in this case achieves the same operation and benefits as described above.

An information processing device control method according to the present invention can also be provided as a control program to be run by the controller of the information processing device. This control program can be supplied using a recording medium on which the control program is recorded. The control program can also be transferred via the Internet or other computer network, for example, for recording by the user on a recording medium accessible to the user's computer or printing apparatus.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

A first embodiment of the present invention is described as follows and which is illustrative of the present invention, but not limitative of the intended scope of the accompanying claims.

The basic configuration of a printing apparatus according to a preferred embodiment of the present invention is shown in FIG. 1. A printing apparatus according to the present invention provides a new function in response to a new control command. The CPU 105 in the present invention therefore performs additional operations, and the storage device 108 of the present invention stores more and different information than does a printing apparatus in the related art.

This new control command enables a printing apparatus according to the present invention to specify the resume operation to be performed following recovery from an off-line state according to the cause of the off-line state, and then select and perform the specified resume operation at the appropriate time.

The interface therefore functions as a receiver, the receive buffer or print buffer functions as a data buffer, the print head and paper feed mechanism collectively function as a printing unit, and the CPU functions as a controller in this preferred embodiment. The CPU and storage device together function as an operation setting section or specification section.

The present invention includes the following three commands for specifying and selecting a resume operation as noted above. These commands are transmitted to the printer 101 from host transmitter 102a.

(a) Command for specifying the off-line state resume operation

ESC A n m (in hexadecimal: 1B 41 n m, where n is an integer from 1 to 3, and m is an integer from 1 to 4)

(b) Set marker command

ESC B (in hexadecimal: 1B 42)

(c) Printer re-initialization command

ESC C (in hexadecimal: 1B 43)

It will be obvious that these command statements can be varied as needed. Furthermore, it should be noted that the set marker command (ESC B) and printer re-initialization command (ESC B) provide additional functions, and versions without these commands are alternate embodiments of the present invention.

These commands are described in further detail below.

Command ESC A is for setting (preselecting) the resume operation to be performed after recovery from an off-line state. Parameter n indicates the cause of the off-line state. Exemplary values for n in this preferred embodiment are shown below.

n=1 off-line state caused by an error n=2 off-line state caused by end of roll paper or other continuous form n=3 operator-selected off-line state Parameter m indicates the process to be performed following the off-line state. Exemplary values for m in this preferred embodiment are shown below.

m=1 Continue printing. Resume printing from the beginning of the line that was being printed when the printing apparatus went off-line. In a page mode printer, resume printing from the beginning of the area that was being printed. If a command was being processed when the printing apparatus went off-line, continue command processing.

m=2 Clear buffers. Clear all data in the receive and print buffers before resuming operation from an off-line state. Also send a "data cleared" declaration to the host. However, retain any printer definitions (print settings defined by various commands) stored in the printer. If a command was being processed, terminate command processing.

m=3 Set a print marker. This is defined in further detail below.

m=4 Reinitialize and print. This is defined in further detail below.

For example, if the host 102 sends the command ESC A 2 1, the printer 101 is set to continue printing after resuming operation from an off-line state resulting from the paper supply running out.

The storage device 108 of the printer 101 therefore has an area 108a (FIG. 1A) for storing the settings defined in command ESC A n m. A storage area is provided for each off-line cause n, and each of these storage areas stores m resume operations. In the present embodiment, for example, there are three such storage areas because n=3, and each storage area must be 2 bits because m=4. A total storage area of 6 bits is therefore required.

Figure 1A:
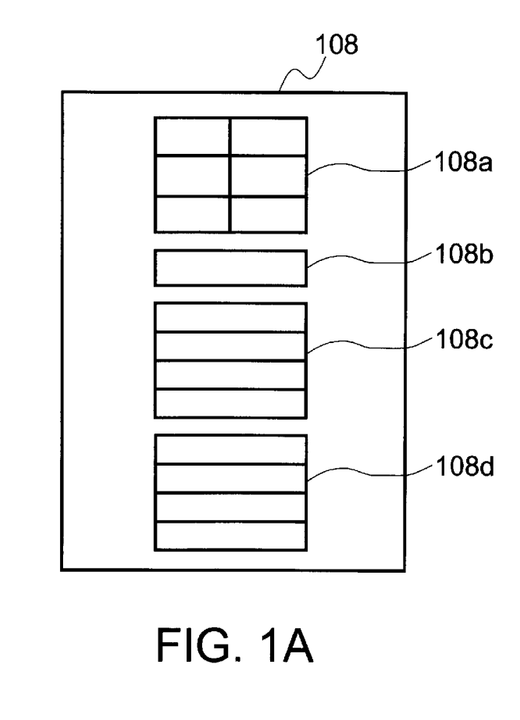
FIG. 1A shows the space allocation of storage device 108 of FIG. 1.

It will be obvious that these parameters can change with the number of off-line state causes defined and the number of resume operations to be performed. Considering simply the convenience of access by the CPU 105, each storage area could also be one byte or one word. It is also possible to use a method in which the address of a specific procedure required to perform a desired process is stored, or some other type of information with a known correlation to the type of resume operation to be performed is stored.

Printer 101 operation is described next. The basic or general process is performed by the printer 101 is as follows.

(a) Data sent from host 102 is stored in receive buffer 104.

(b) Data buffered in receive buffer 104 is interpreted; print data is readied in print buffer 107, and then printed.

(c) An off-line state occurs and a resume operation is performed.

Figure 2:
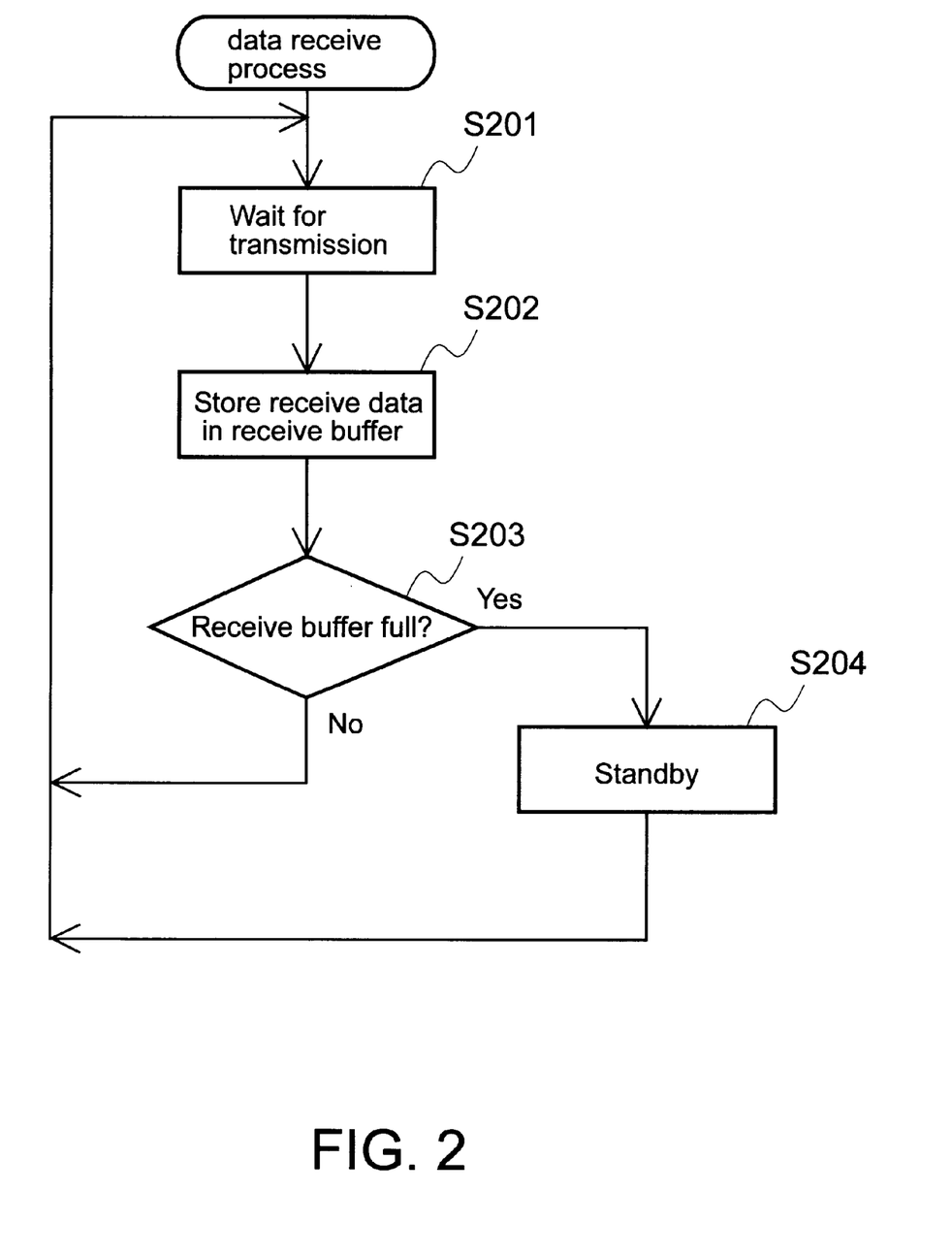
FIG. 2 is a flow chart showing the basic operation of the data receiving process in a printing apparatus according to the present invention.

Referring next to FIG. 2, the process (a) for storing data received from the host 102 in the receive buffer 104 is described as follows.

(1) The printer waits for data to be sent from the host 102 (S201).

(2) Received data is appended to the data already stored in the receive buffer 104 (S202).

(3) Decision step S203 then determines whether the receive buffer 104 is full. If it is not, the procedure loops back to the first step (S201).

(4) If the receive buffer 104 is full, no further data is received and the process stands by (S204) until an space for new data becomes available in the receive buffer 104. When it does, the procedure loops back to the first step (S201).

Note that the procedure shown in FIG. 2 can be modified to loop from step S204 to S203 until there is space available in the receive buffer 104. However, by entering a standby state in step S204 and allowing control to pass to another process, the processing capacity of the CPU 105 can be used more efficiently. Note that it is assumed below that a standby state includes allowing control to pass to another process.

Figure 3:
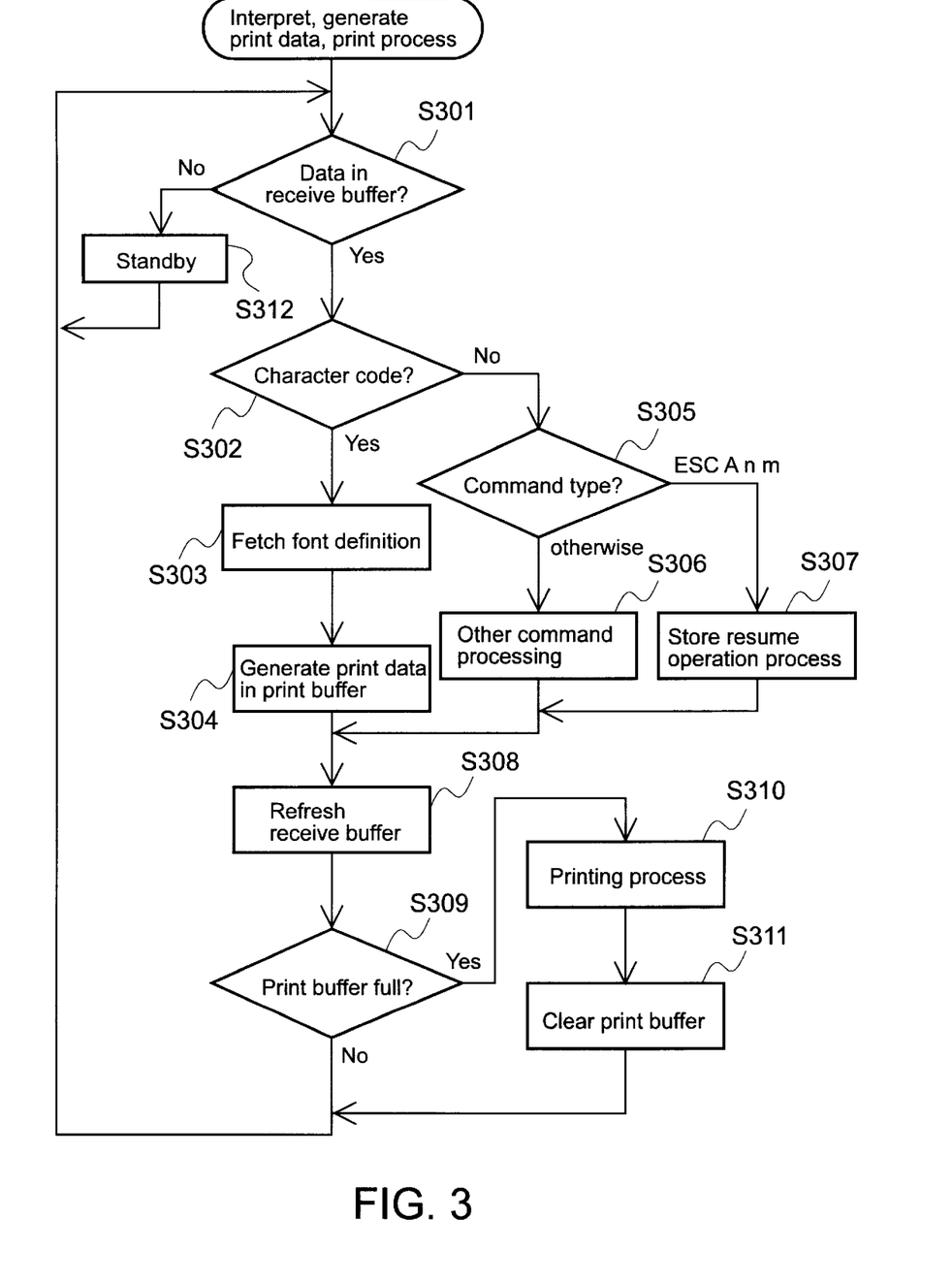
FIG. 3 is a flow chart showing the basic data interpretation, print data generation, and printing process in a printing apparatus according to the present invention.

The process wherein the data stored in receive buffer 104 is interpreted, and print data is generated in print buffer 107, and then printed, is described next with reference to the flow chart in FIG. 3.

(1) Decision step S301 determines whether there is any data in the receive buffer 104. If not, the printer enters a standby state (S312). If there is, it advances to the next step (S302).

(2) It is then determined whether the data in the receive buffer 104 is a character code (S302).

(3) If the data is a character code, the font definition for the character is read from the font ROM 106 (S303), corresponding print data is generated in the print buffer 107 (S304), and control passes to step (8) below.

(4) If the data in the receive buffer 104 is not a character code, the command type is determined (S305).

(5) If an ESC A command is received specifying the off-line state resume operation to be performed, control passes to step (7) below.

(6) If any other type of command is received, the command processing corresponding to the command type is performed (S306), and control passes to step (8) below.

(7) If an ESC A command is determined at step S305, parameter n is detected, and parameter m is stored in the corresponding parameter n storage area 108a to define the resume operation to be performed for a specific off-line state cause (S307).

(8) The receive buffer 104 is refreshed (S308). This increases available memory in the receive buffer 104 by an amount equal to the processed data.

(9) Decision step S309 then determines whether the print buffer 107 is full. If not, the procedure loops back to step S301.

(10) If the print buffer 107 is full, the print head 109 is driven in the printing process (S310), the print buffer 107 is cleared (S311), and control loops back to step S301. An off-line state may occur during the printing process (S310), in which case control passes to the off-line process.

Figure 4:
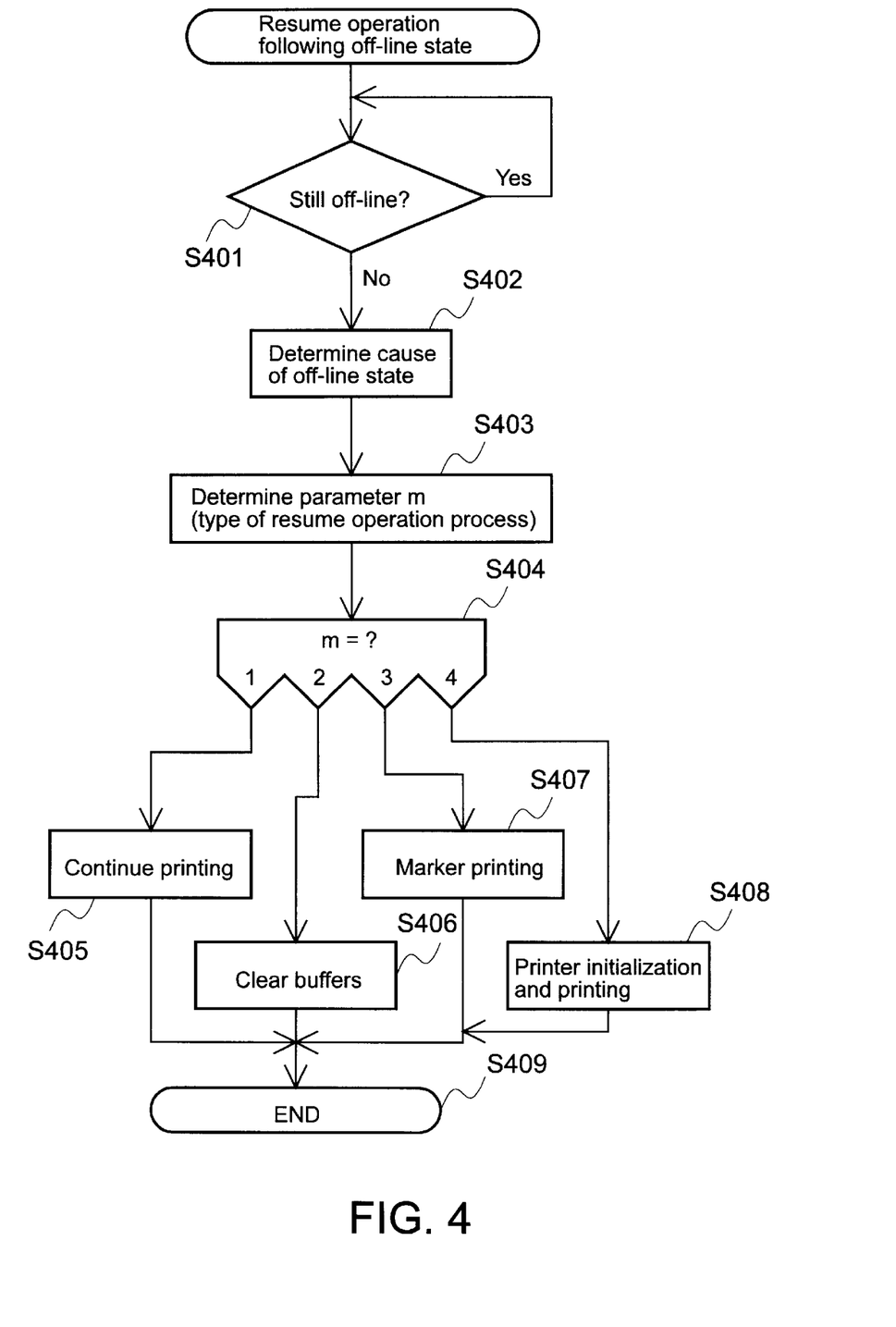
FIG. 4 is a flow chart showing the basic operation of the off-line state generation and resume process in a printing apparatus according to the present invention.

The process for resuming operation after the printing apparatus goes off-line is described with reference to the flow chart in FIG. 4 as follows.

(1) The first step is determining whether the printer is off-line (S401). This step is repeated until the printer recovers from the off-line state. When the cause of the off-line state is resolved and the printer is brought on-line again, control passes to step S402.

(2) The cause of the off-line state is then determined in step S402. In this preferred embodiment of the invention, the off-line state cause is represented by parameter n and classified as one of three types as described above.

(3) The storage area 108a in storage device 108 corresponding to the specified parameter n is then read to obtain the type of resume operation to be performed (S403). As described above, resume operations are specified by parameter m as one of four types in this preferred embodiment.

(4) The resume operation type (parameter m) is then detected (S404).

(5) If m=1, printing is continued based on the data currently stored in the receive buffer 104 and print buffer 107 (S405).

(6) If m=2, the receive buffer 104 and print buffer 107 are cleared (S406).

(7) If m=3, the set marker process is performed (S407). This is described in further detail below.

(8) If m=4, the reinitialize and print process is performed (S408). This is described in further detail below.

(9) This process terminates and passes control to another process (S409).

In this preferred embodiment and process described above, it is thus possible to preselect the process to be performed when resuming operation from an off-line state, and have the predefined process be dependent on the cause of the printer going off-line. As a result, a desired resume operation can be performed for a particular cause of the off-line state.

An additional marker registration and marker printing process are described as follows. This process registers a marker enabling the printing apparatus to return to and resume printing from a particular point in the print data after resuming operation from an off-line state.

When a set marker command (ESC B) is received from the host 102, the printer 101 stores the command as a "marker" in the receive buffer 104. The set marker process described below is performed when the set marker command (ESC B) is detected during command processing (steps S305 and S306 in FIG. 3).

(1) The address of the area in which the set marker command (ESC B) is stored in the receive buffer 104 is stored in a marker storage area or pointer section 108b ("marker pointer" below) reserved in the storage device 108 (FIG. 1A).

(2) Also when the marker command is detected, the various current printer definitions stored in current printer definition storage area 108c of the printer are copied to a marker definition data storage area or definition copy section 108d reserved in the storage device 108.

Figure 5:
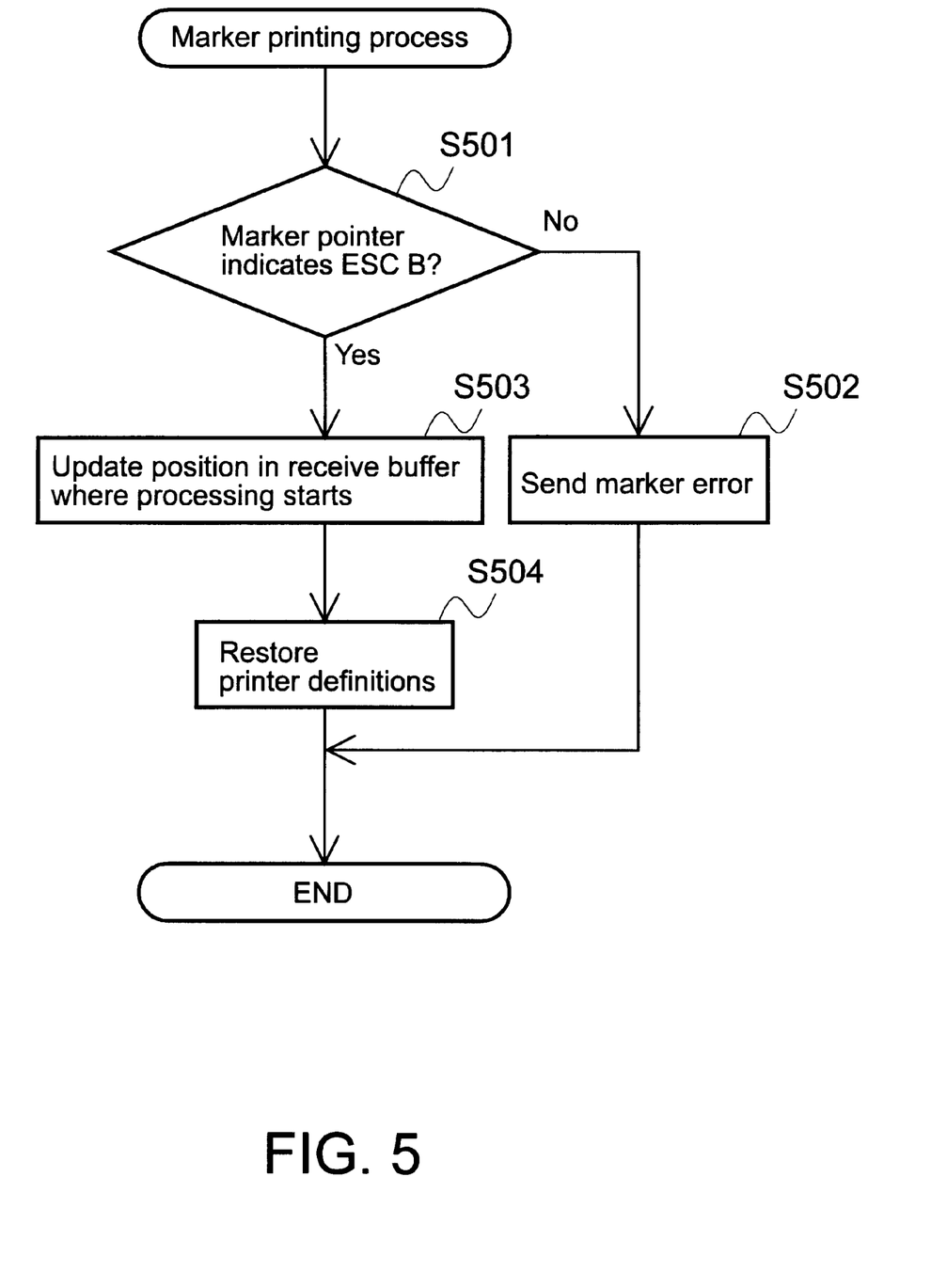
FIG. 5 is a flow chart showing the basic operation of the marker printing process in a printing apparatus according to the present invention.

The marker printing process that is performed when the printing apparatus resumes operation from an off-line state is described next with reference to the flow chart in FIG. 5.

(1) The print data stored in the address in receive buffer 104 indicated by the marker pointer is read and evaluated (S501), i.e. by CPU 105.

(2) If the stored data is ESC B, control passes to step (4) below.

(3) If the stored data is not ESC B, the marker has been overwritten by subsequently received data. This can occur when the receive buffer 104 is a ring buffer. It is also possible that some other type of error has occurred in the receive buffer 104. In any event, if the stored data is not ESC B, a marker error is sent to receiver 102b of the host 102 (S502), and the marker printing process terminates. A notification section of the printer is comprised, for example, by notification section 105a of CPU 105 that notifies host 102 of the result of a resume operation following an off-line state. This notification is, for example, a marker error sent to host 102 through interface 103. The host includes a re-sending section 102c that re-sends the print data or commands via transmitter 102a when the receiver 102b receives notification from the printer 101 that the resume operation could not be successfully executed.

(4) If in step S501 it is determined that the stored data is an ESC B command, the receive buffer 104 contents are then in condition to resume data processing from the address in receive buffer 104 indicated by the marker pointer, and processing flow is updated to begin at that address (S503).

(5) The definition data stored in the marker definition data storage area 108d is then copied to the current printer definition data storage area 108c in the printer (S504). This makes it possible to restore the printing mode and other printer settings to the settings that were current when the marker was registered (i.e. storing the marker command address when it was first detected).

(6) When this procedure ends, control passes back to the printing process, thereby enabling printing to resume from the place at which the marker was set (i.e. where the marker command was encountered).

A marker can be set at the beginning of each receipt to be printed by sending a set marker command (ESC B) before sending the print data for each receipt. By thus setting a marker at the beginning of each receipt, it is possible to return to the marker to resume printing from the beginning of the receipt when the printing apparatus resumes operation from the off-line state that occurred while printing a receipt. Printing only the remaining unprinted part of a receipt can thus be eliminated and the entire receipt can be printed again from the beginning. As a result, a complete receipt can be printed on a single form.

While using only one marker is considered in the above preferred embodiment of the invention, it will be obvious that plural markers can also be set. The marker pointer and marker definition data storage area must be increased according to the number of markers set in this case. Setting a plurality of markers will also make it possible to resume printing from any desired marker by, for example, specifying whether printing is to resume from the most recent marker, the next most recent marker, and so forth. When a plurality of markers is set, it is also possible to assign a number or name to each marker. If each marker is assigned a number, for example, a printing process could target printing from, say, "marker 5". Various known methods can be used to direct the printing process as the number of markers is increased.

As printer definitions are stored in marker definition data storage area, it is necessary to output the printer definition command(s) only one time if the printer definitions are used for plurality of receipts in common.

It should be noted that the capacity of the receive buffer 104 is typically significantly greater than the amount of data printed on a single receipt. In this preferred version of the present invention, for example, the receive buffer 104 capacity is 4 kilobytes while the data printed on one receipt occupies only 400 bytes. In such cases, the markers are rarely overwritten.

Marker validity is determined in this preferred embodiment by detecting whether a set marker command (ESC B) is stored at an address indicated by the marker pointer, but other methods can be alternatively used. For example, the data storage address and address indicated by a marker pointer can be compared each time data received from the host is stored in the receive buffer 104. If the data storage address is beyond the address (e.g. higher in number) indicated by a marker pointer, the marker is determined to be invalid, and the marker pointer is set to null. In this case, the marker printing process will detect the marker pointer value and will send a marker error to the host 102 if a null value is detected.

The printer re-initialization command and re-initialization command printing process are described as follows.

This process is similar to the marker registration and marker printing process described above, but differs in the following respects. The set marker command (ESC B) causes the current printer definitions to be stored so that the printer can be reset to the previous settings based on those stored printer definitions when the printing apparatus resumes operation from an off-line state. With the printer re-initialization command (ESC C), however, the printer definitions are returned to the default printer definitions, and the print buffer 107 is cleared. There is also no need for a marker pointer storage area. This method is therefore suitable for a printing apparatus having limited storage capacity.

When re-initialization command printing occurs, the receive buffer 104 is searched from the end to the beginning for an address at which ESC C is stored. Data interpretation, print data generation, and printing processes then resume from the address at which ESC C was found.

Firstly the printer definitions are restored to the default settings, and the print buffer 107 is cleared. Normal data processing proceeds thereafter.

As described above, this preferred embodiment of the present invention searches an address in which ESC C is stored by proceeding from the end to the beginning of the receive buffer 104 as described above, and returns the first ESC C address found as the search result. It will also be evident, however, that the search could proceed from the beginning to the end of the receive buffer 104, including address areas containing data that has already been processed, and return the last ESC C address found as the search result.

Another alternative is to store a pointer to the ESC C location in the receive buffer 104 when a printer re-initialization command (ESC C) is detected. A pointer storage area and processing similar to that described above for set marker command (ESC B) management is required in this case, but the advantage is that the ESC C location can be determined immediately without searching the receive buffer 104.

Since print command interpreting, data generation, and printing need to proceed from the ESC C command address in the receive buffer 104, the content of receive buffer 104 must be maintained. In this regard this re-initialization printing process differs from turning the printer power off.

When ESC C is overwritten in the receive buffer 104, that is, when ESC C is not found, a re-initialization command error is sent to the host 102. This is the same as in the marker registration and marker printing process described above.

Receipt printing using the printer re-initialization command (ESC C) and re-initialization command printing process is described as follows.

The host 102 sends the printer re-initialization command (ESC C) followed by any appropriate printer definition command(s) for that receipt, and then sends the print data, that is, what is to be printed on the receipt. This process is repeated for each receipt to be printed.

It is therefore necessary to output the printer definition command(s) as many times as there are receipts to be printed. While this is somewhat repetitive, the advantage is that a separate storage area is not required for printer definition data, as is the case with the marker registration and printing process described above. Printer construction is thereby simplified, and printer cost can be reduced.

In addition, when the printing apparatus resumes operation from an off-line state, a printer 101 according to this preferred embodiment of the invention can resume processing from the beginning of the last receipt processed. In other words, the printer re-initialization command (ESC C) can be used to indicate the appropriate point from which processing is to resume when the printing apparatus resumes operation from an off-line state.

As will be evident from the preceding description, a printing apparatus according to the present invention can select the process to be performed when resuming operation from an off-line state. It is therefore possible to retain any printer definitions stored in the printer when the printing apparatus resumes operation from an off-line state, and prevent wasteful receipt printing.

The resume operation can also be freely selected, and the host device can be notified when the selected process cannot be performed. User-friendliness and ease-of-use when the printing apparatus resumes operation from an off-line state are thus greatly improved.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus for printing information in accordance with commands or print data received from a host device, comprising:

a receiver that receives at least one of print data and commands from the host device;

a buffer that stores the at least one of print data and commands received by the receiver;

a printing unit that prints information in accordance with the at least one of print data and commands stored in the buffer;

an operation setting section that selects one out of a plurality of resume operations to be performed when the printing apparatus resumes operation following an off-line state, said operation setting section being responsive to a first command from the host device;

a storage that stores the resume operation selected by said operation setting section;

a detector that detects whether a cause of the off-line state is resolved; and a controller that performs the resume operation stored in said storage in accordance with said detector having detected that the cause of the off-line state is resolved.

2. The printing apparatus as set forth in claim 1, wherein said plurality of resume operations includes an operation for restarting printing from a beginning of an area that was being printed when the printing apparatus went off-line.

3. The printing apparatus as set forth in claim 1, wherein said plurality of resume operations includes an operation for continuing a command process that was being performed when the printing apparatus went off-line.

4. The printing apparatus as set forth in claim 1, wherein said plurality of resume operations includes an operation for clearing print data and command data stored in the buffer.

5. The printing apparatus as set forth in claim 1, wherein said plurality of resume operations includes an operation for stopping a command process that was being performed when the printing apparatus went off-line.

6. The printing apparatus as set forth in claim 1, further comprising a pointer section that stores address information specifying one of a particular print data and a command stored in the buffer in accordance with a second command from the host device, wherein said plurality of resume operations includes an operation for printing in accordance with one of print data and command stored in the buffer at the address stored in the pointer section.

7. The printing apparatus as set forth in claim 6, further comprising a definition copy section that stores a copy of printing apparatus settings information, and said plurality of resume operations includes an operation for resetting the printing apparatus according to the settings information stored in the definition copy section.

8. The printing apparatus as set forth in claim 1, further comprising: a notification section that informs the host device of the result of a resume operation following an off-line state.

9. A method for controlling a printing apparatus for printing information in accordance with commands or print data received from a host device, comprising:

(a) receiving at least one of print data and commands from the host device;

(b) storing in a buffer the at least one of print data and commands received in the receiving step;

(c) printing information in accordance with the at least one of print data and commands stored in the buffer;

(d) selecting one out of a plurality of resume operations to be performed when the printing apparatus resumes operation following an off-line state, in response to a first command from the host device;

(e) storing the resume operation selected by said selecting step (d);

(f) detecting whether a cause of the off-line state is resolved; and (g) performing the resume operation stored by said storing step (e) in accordance with said detecting step (f) having detected that the cause of the off-line state is resolved.

10. The control method as set forth in claim 9, wherein said plurality of resume operations includes an operation for restarting printing from a beginning of an area that was being printed when the printing apparatus went off-line.

11. The control method as set forth in claim 9, wherein said plurality of resume operations includes an operation for continuing a command process that was being performed when the printing apparatus went off-line.

12. The control method as set forth in claim 9, wherein said plurality of resume operations includes an operation for clearing print data and command data stored in the buffer.

13. The control method as set forth in claim 9, wherein said plurality of resume operations includes an operation for stopping a command process that was being performed when the printing apparatus went off-line.

14. The control method as set forth in claim 9, further comprising:

(h) receiving a second command from the host device and, in accordance with the second command, storing in a pointer section address information specifying one of a particular print data and a command stored in the buffer; and wherein said plurality of resume operations includes an operation for printing in accordance with one of print data and command stored in the buffer at the address stored in the pointer section.

15. The control method as set forth in claim 14, further comprising:
(i) storing a copy of printing apparatus settings information in a definition copy section; and
wherein said plurality of resume operations includes an operation for resetting the printing apparatus according to the settings information stored in the definition copy section.

16. The control method as set forth in claim 9, further comprising notifying the host device of the result of a resume operation following an off-line state.

17. A medium readable by a machine embodying a program of instructions executable by said machine to perform a method of controlling a printing apparatus for printing information in accordance with commands or print data received from a host device, the method comprising:
(a) receiving at least one of print data and commands from the host device;
(b) storing in a buffer the at least one of print data and commands received in the receiving step;
(c) printing information in accordance with the at least one of print data and commands stored in the buffer;
(d) selecting one out of a plurality of resume operations to be performed when the printing apparatus resumes operation following an off-line state, in response to a first command from the host device;
(e) storing the resume operation selected by said selecting step (d);
(f) detecting whether a cause of the off-line state is resolved; and
(g) performing the resume operation stored by said storing step (e) in accordance with said detecting step (f) having detected that the cause of the off-line state is resolved.

18. The medium as set forth in claim 17, wherein said plurality of resume operations includes an operation for restarting printing from a beginning of an area that was being printed when the printing apparatus went off-line.

19. The medium as set forth in claim 17, wherein said plurality of resume operations includes an operation for continuing a command process that was being performed when the printing apparatus went off-line.

20. The medium as set forth in claim 17, wherein aid plurality of resume operations includes an operation for clearing print data and command data stored in the buffer.

21. The medium as set forth in claim 17, further comprising said plurality of resume operations includes an operation for stopping a command process that was being performed when the printing apparatus went off-line.

22. The medium as set forth in claim 17, wherein the method further comprises (h) receiving a second command from the host device and, in accordance with the second command, storing in a pointer section address information specifying one of a particular print data and a command stored in the buffer; and
wherein said plurality of resume operations includes an operation for printing in accordance with one of print data and command stored in the buffer at the address stored in the pointer section.

23. The medium as set forth in claim 22, wherein the method further comprises (i) storing a copy of printing apparatus settings information in a definition copy section; and
wherein said plurality of resume operations includes an operation for resetting the printing apparatus according to the settings information stored in the definition copy section.

24. The medium as set forth in claim 17, wherein the method further comprises notifying the host device of the result of a resume operation following an off-line state.

25. A information processing apparatus connected to a printing apparatus for controlling the printing apparatus by sending thereto print data or commands, comprising:
a transmitter that sends a command defining the printing apparatus operation to be performed when the printing apparatus resumes operation following an off-line state;
a receiver that receives from the printing apparatus notification of a result of a resume operation following an off-line state; and
a re-sending section that re-sends at least one of print data and commands when the receiver receives notification from the printing apparatus that the resume operation could not be successfully executed.

26. A control method for an information processing apparatus connected to a printing apparatus for controlling the printing apparatus by sending thereto print data or commands, comprising:
sending a command defining the printing apparatus operation to be performed when the printing apparatus resumes operation following an off-line state;
receiving from the printing apparatus notification of a result of a resume operation following an off-line state; and
re-sending at least one of print data and commands after receiving notification from the printing apparatus that the resume operation could not be successfully executed.

27. A medium readable by a machine embodying a program of instructions executable by said machine to perform a method of controlling an information processing apparatus connected to a printing apparatus for controlling the printing apparatus by sending thereto print data or commands, the method comprising:
sending a command defining the printing apparatus operation to be performed when the printing apparatus resumes operation following an off-line state;
receiving from the printing apparatus notification of a result of a resume operation following an off-line state; and
re-sending at least one of print data and commands after receiving notification from the printing apparatus that the resume operation could not be successfully executed.

28. A system comprising a printing apparatus and an information processing apparatus connected to the printing apparatus for controlling the printing apparatus by sending thereto print data and control commands, wherein the printing apparatus comprises:
a receiver that receives at least one of print data and commands from the information processing apparatus;
a buffer that stores the at least one of print data and commands received by the receiver;
a printing unit that prints information in accordance with the at least one of print data and commands stored in the buffer;
an operation setting section that selects one out of a plurality of resume operations to be performed when the printing apparatus resumes operation following an off-line state, said operation setting section being responsive to a first command from the information processing apparatus;

a storage that stores the resume operation selected by said operation setting section;

a detector that detects whether a cause of the off-line state is resolved; and a controller that performs the resume operation stored in said storage in accordance with said detector having detected that the cause of the off-line state is resolved;

a pointer section that stores address information specifying one of a particular print data and a command stored in the buffer in accordance with a second command from the information processing apparatus;

wherein said a plurality of resume operations includes an operation for printing in accordance with one of print data and command stored in the buffer at the address stored in the pointer section; and wherein the information processing apparatus comprises:

a transmitter for sending a control command which requires the printing apparatus to perform printing in accordance with at least one of print data and control commands stored at a predetermined area in the buffer when the printing apparatus resumes operation from an off-line state;

a receiver for receiving from the printing apparatus an error notification that information specifying said predetermined area is not contained in the buffer; and a re-sending section for resending at least one of print data and control commands corresponding to the at least one of print data and control commands stored at the predetermined area in the buffer when the receiver receives the error notification from the printing apparatus.

* * * * *